United States Patent [19]

Miller, Jr. et al.

[11] 4,033,615
[45] July 5, 1977

[54] PORT THREAD

[75] Inventors: Raymond A. Miller, Jr., Madison Heights; Douglas M. Thornton, Rochester, both of Mich.

[73] Assignee: Ross Operating Valve Company, Detroit, Mich.

[22] Filed: June 16, 1975

[21] Appl. No.: 587,121

[52] U.S. Cl. .................................... 285/333; 85/46; 285/390
[51] Int. Cl.² ......................................... F16L 15/00
[58] Field of Search .......... 285/175, 333, 334, 390, 285/355, 219; 85/46; 403/343, 184

[56] References Cited

UNITED STATES PATENTS

| | | | |
|---|---|---|---|
| 597,000 | 1/1898 | Higbee | 285/333 |
| 720,578 | 2/1903 | Greenfield | 285/175 |
| 1,973,848 | 9/1934 | Duffy | 285/333 X |
| 2,056,112 | 9/1936 | Protin | 285/333 |
| 3,079,181 | 2/1963 | Van Der Wissel | 285/333 |
| 3,158,390 | 11/1964 | Woodling | 285/334 |
| 3,175,850 | 3/1965 | Steczynski | 285/333 |
| 3,323,402 | 6/1967 | Gowen, Jr. et al. | 85/46 X |

FOREIGN PATENTS OR APPLICATIONS 413,027  7/1934  United Kingdom ............... 285/333

OTHER PUBLICATIONS

"Handbook of Fastening and Joining of Metal Parts", Laughner and Hargan, 1956, p. 63.
"Screw-Thread Standards for Federal Services", 1957, Handbook H28 (1957)–Part II, No. 28, pp. 18–19.
"Automatic Thread Grinding Machines", Jones & Lamson, 1946, pp. 12–13.

*Primary Examiner*—Thomas F. Callaghan
*Attorney, Agent, or Firm*—Harness, Dickey & Pierce

[57] ABSTRACT

A method and construction for the formation of an internal thread for fluid or other ports which may receive NPT, BSP tapered, or BSP parallel external threads. The port configuration varies with different nominal tube bore diameters, but comprises one or more of the following:
  Adjustment of tooth form.
  Adjustment of pitch.
  A tapered entry and parallel inner portion.

The invention applied at least to nominal diameters between ⅛ and 1½ inches.

2 Claims, 19 Drawing Figures

| Nom. Tube Bore | Thds/in. | A | B | L | P | R | T | T4 | Remarks |
|---|---|---|---|---|---|---|---|---|---|
| 1/8 | 27½ | .3844 | .3396 | .32 | .03636 | .005 | .006 | .11 | 1.78 Taper Per. Ft. Tap Depth To Be .03 To .05 Shallow of N.P.T. Gage |
| 1/4 | 18½ | .5776 | .4564 | .48 | .05411 | .0075 | .009 | .21 | 1.06 Taper Per. Ft. Tap To N.P.T. Plug Depth |
| 3/8 | 18½ | .6606 | .5944 | .48 | .05411 | .0075 | .009 | .11 | 1.06 Taper Per. Ft. Tap To N.P.T. Plug Depth |
| 1/2 | 14 | .8298 | .7428 | .56 | .07143 | .010 | .012 | .15 | 1.06 Taper Per. Ft. Tap To N.P.T. Plug Depth |
| 3/4 | 14 | 1.0474 | .9604 | .56 | .07143 | .010 | .012 | 0 | |
| 1 | 11½ | 1.5142 | 1.2040 | .64 | .08889 | .012 | .014 | 0 | |
| 1¼ | 11½ | 1.6557 | 1.5441 | .64 | .08889 | .012 | .014 | 0 | |
| 1½ | 11½ | 1.8871 | 1.7729 | .64 | .08889 | .012 | .014 | 0 | |

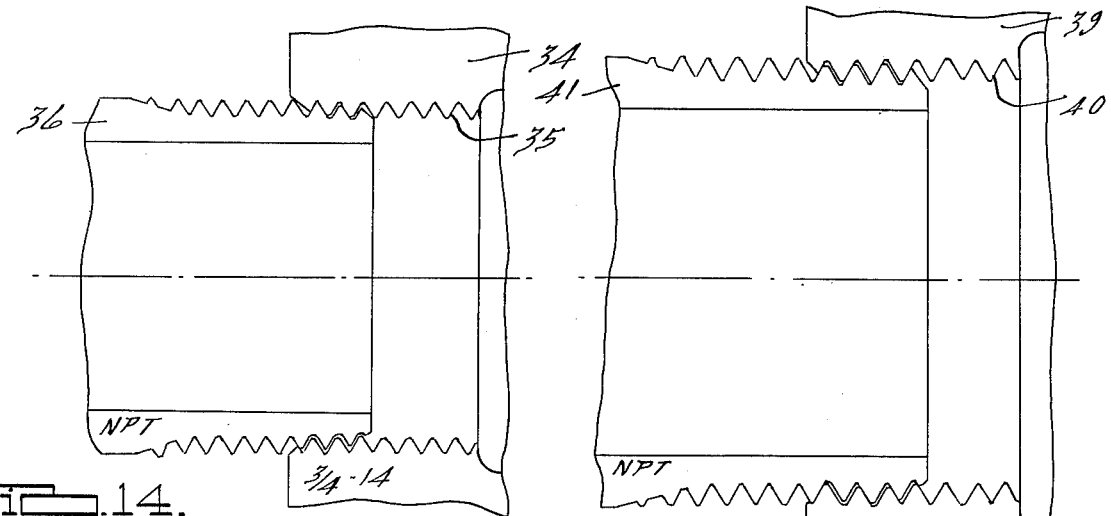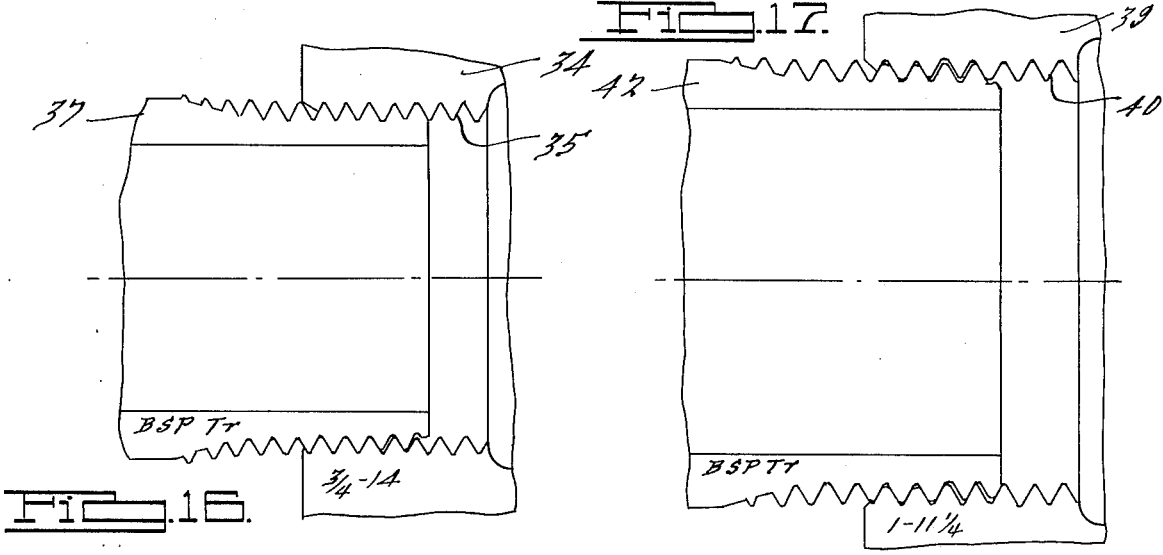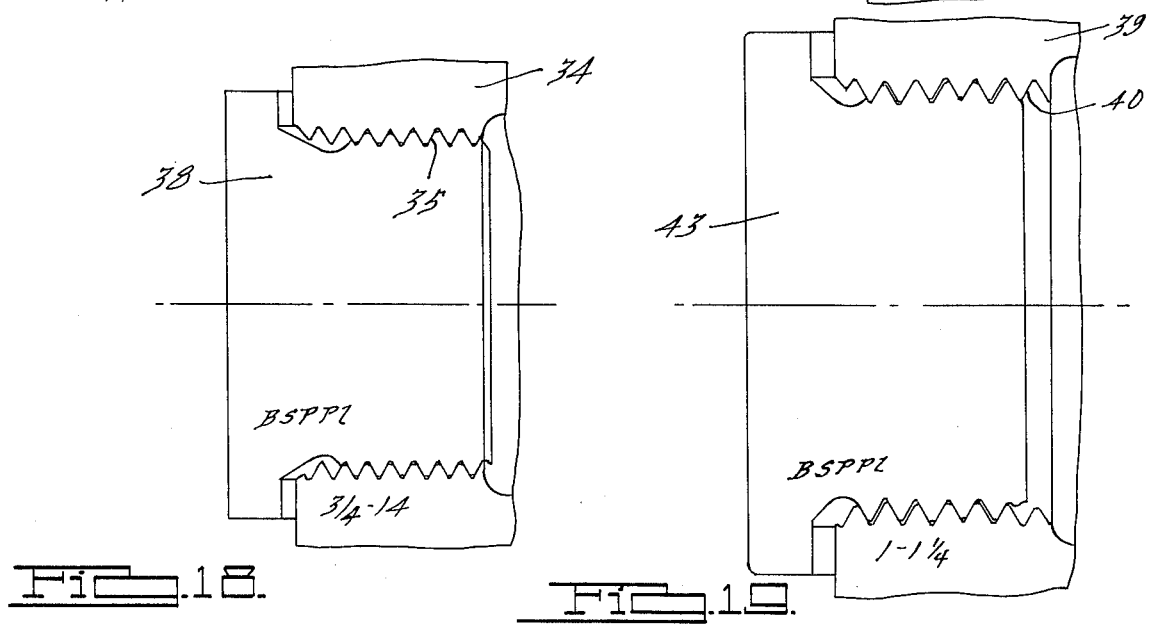

PORT THREAD

BACKGROUND OF THE INVENTION

1. Field of the Invention

The invention relates to threaded fluid ports in base-mounted valves and other equipment which are intended to receive pipes, fittings, plugs or other connecting hardware in a manner such that a fluid-tight joint is formed. The invention is also applicable to ports for electrical conduits or other threaded connections.

2. Description of the Prior Art

Ordinarily, female port threads are formed so as to be compatible with any one of three standard thread forms, known as National Pipe Thread (NPT), British Standard Pipe, Tapered (BSP Tr.), and British Standard Pipe Parallel (BSP Pl.). Often however, it is desired that an available part with a female port thread of one type be fitted with hardware having an external thread of another type. This has heretofore been unfeasible in certain instances. For example, a BSP port thread cannot ordinarily accept NPT hardware without excessive plastic deformation of the mating parts.

It has been common to insert a tapered male thread into a parallel female thread so that sealing is effected only at the outer threads. Here again, however, the use of NPT external threads in a BSP parallel port has not been uniformly satisfactory because of excessive plastic deformation.

BRIEF SUMMARY OF THE INVENTION

It is an object of the present invention to provide a construction and method for forming a port thread which, at any given nominal tube bore diameter, is essentially compatible with NPT, BSP Tr., and BSP Pl. external hardware threads.

It is an associated object to provide a construction and method for port thread formation which enables the manufacture of uniform valve bodies or bases for worldwide distribution with a saving in cost of machining and labor, an important reduction of inventory requirements, and field interchangeability which enables a customer to purchase a part from any sales outlet and ship it anywhere in the world.

In its broadest aspect, the invention comprises a port thread for the reception of external hardware of NPT, BSP Tr. or BSP Pl. configurations and for nominal tube bores at least between ⅛ and 1½ inches in which the included angle between the thread surfaces is substantially 57½°.

In another aspect, the invention comprises a port thread for the reception of external hardware of NPT, BSP Tr. or BSP Pl. threads and nominal tube bores at least between ⅛ and ½ inch, comprising at least two threads at the entrance to the port which are tapered inwardly, the remaining threads being parallel, the included angle between the thread sides being substantially 57½°, the thread pitch throughout the port being substantially midway between the pitches of NPT and BSP threads for the nominal tube bore.

In yet another aspect, the invention comprises a threaded port for the reception of hardware having NPT, BSP Tr. or BSP Pl. external threads with nominal tube bores at least between ⅛ and 1½ inches, comprising threads having a pitch substantially midway between the NPT and BSP pitches for the nominal tube bore and an included angle between thread sides of substantially 57½°.

As a method, the present invention in its broadest aspect is for forming an internal port thread for the reception of NPT, BSP Tr. or BSP Pl. hardware with nominal tube bores at least between ⅛ and 1½ inches comprising the steps of forming said port thread with an included angle between the thread sides of substantially 57½° and a thread pitch substantially midway between the pitches of NPT and BSP threads for the nominal bore. As a further aspect of the method, for nominal bores at least between ⅛ and ½ inch, there is the further step of inwardly tapering at least the first two threads at the entrance of the port and forming the remaining threads of parallel.

BRIEF DESCRIPTION OF THE DRAWINGS

FIGS. 14 through 19 show how the port receives NPT, BSP Tr. and BSP Pl. threads for nominal tube bores between ¾ and 1 inch.

DESCRIPTION OF THE PREFERRED EMBODIMENTS

Figure 1:
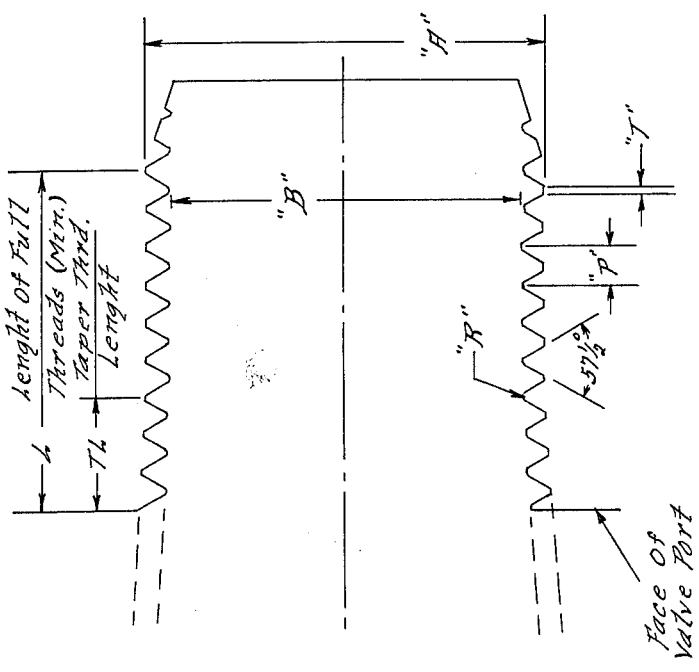
FIG. 1 is a chart showing the manner in which the invention is carried out for different nominal tube bores.

FIG. 1 shows the specifications for preparing taps which would cut threaded ports in accordance with the invention. The port, of course, would be exactly complementary to the main portion of the tap. The first column indicates the nominal bore of the pipe or tube, these bores ranging from ⅛ to 1½ inches. The second column indicates the pitch, that is, threads per inch. The column headed A shows the major diameter for the straight portion of the thread, and B indicates the minor diameter. L shows the minimum length of full threads, of which TL is the length of taper threads. P indicates the pitch, that is, the reciprocal of threads per inch. R and T indicate respectively the radius at the root and the distance across the crest of each thread.

In all cases, the included angle between facing thread sides is 57½°. This portion of the invention is based on the standard requirements for NPT threads of 60° and for BSP threads of 55°.

Figure 2:
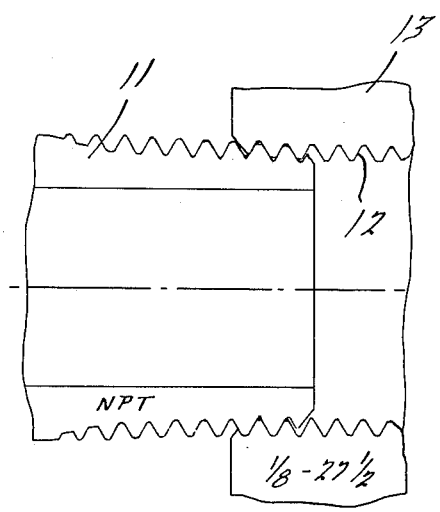
FIGS. 2 through 5 are schematic views showing the manner in which a port formed according to the present invention receives NPT threads of hardware with nominal tube bores between ⅛ and ½ inch.
Figure 6:
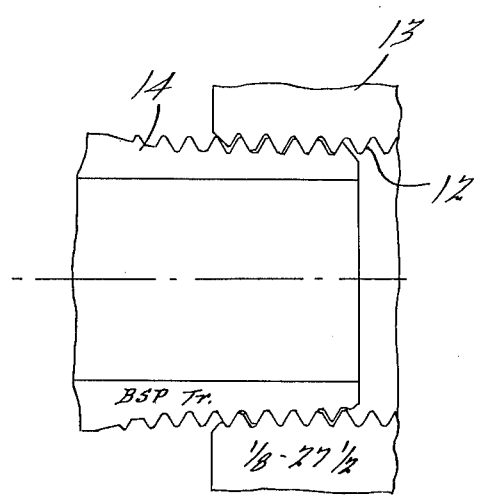
FIGS. 6 through 9 are similar views with BSP Tr. threads.
Figure 10:
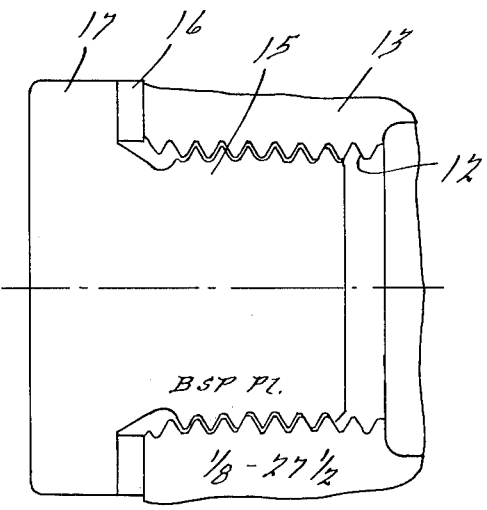
FIGS. 10 through 13 show how BSP Pl. threads are received, a plug being used as the hardware to demonstrate full thread engagement.

FIGS. 2, 6 and 10 illustrate how a tapped port for receiving externally threaded hardware with a ⅛ inch nominal tube bore will accept NPT, BSP Tr. and BSP Pl. threads respectively. According to standards, the major diameter for NPT threads of ⅛ inch nominal tube bore is 0.4073 inch while the major diameter for BSP Pl. is 0.383 inch and that for BSP Tr. is 0.3891 inch. Standards also call for NPT threads of ⅛ inch nominal size to have an entry outside diameter of 0.3908 inch. Because of the oversize condition of NPT relative to BSP, a considerable tapered thread length TL is provided. This will permit the NPT thread to enter the tapped hole for at least two threads in order to create the sealing action. FIG. 2 shows a hand tight position of a tube 11 in the port 12 of a body 13. Further insertion could be accomplished with a slight plastic deformation.

Standards indicate a pitch of 27 threads per inch of NPT at ⅛ inch nominal tube bore and 28 threads per inch for BSP. A pitch of 27½ threads per inch is chosen for port 12 according to the invention for this nominal size.

FIG. 6 shows the insertion of a tube 14 with a BSP Tr. thread in a port 12 of body 13. This shows considerably more thread engagement than the NPT. FIG. 10 shows a plug 15 having a BSP Pl. thread inserted in port 12 of body 13. Here we see that the first few threads of the port which are tapered do not fully engage the plug threads but that there is engagement between the parallel thread portion of the port and the plug. The sealing here is, in accordance with custom, created by the gasket 16 between head 17 of plug 15 and body 13.

Figure 3:
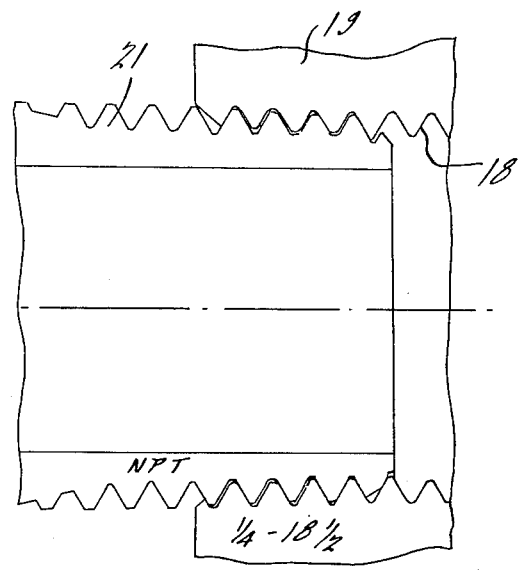
Figure 7:
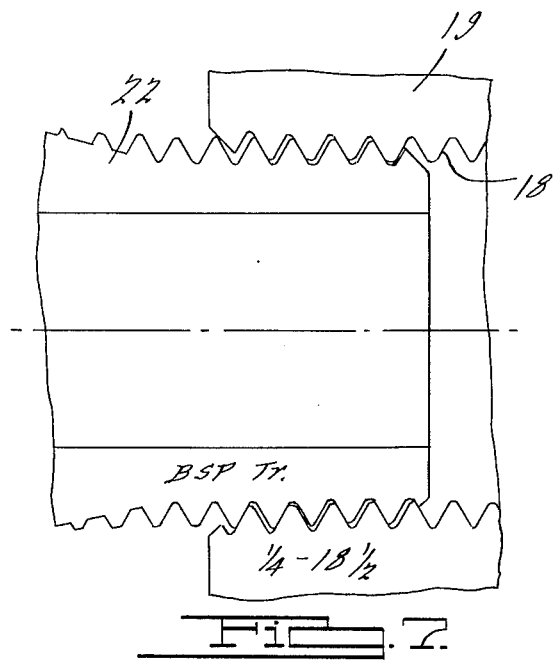
Figure 11:
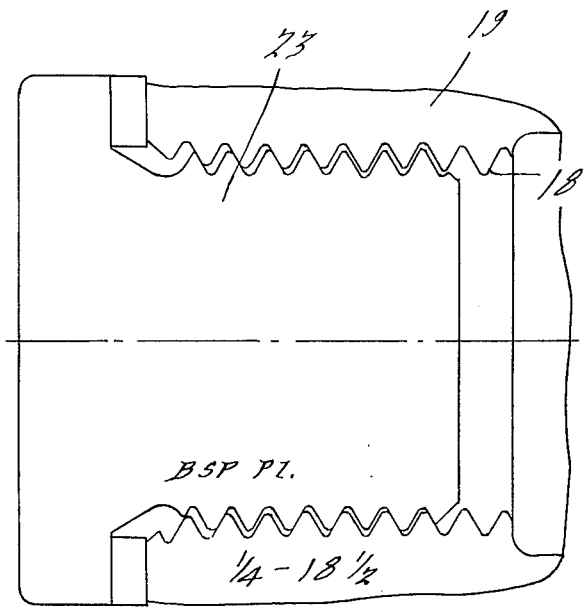

FIGS. 3, 7 and 11 show how the different threads are accepted by a port 18 of a body 19 intended for hardware with nominal tube bores of ¼ inch. In this case, the standards call for NPT threads to have a major diameter of 0.5439 inch, BSP Pl. to have 0.518 inch, and BSP Tr. to have 0.527 inch. Standards also require an entry outside diameter for NPT threads of 0.5188 inch. Therefore, as in the case of the ⅛ inch size, a tapered portion TL is provided and the NPT hardware 21 will seal on this portion.

Standards require NPT threads of ¼ inch nominal size to have a pitch of 18 threads per inch and that of BSP threads have a pitch of 19 threads per inch. The pitch of the port 18 according to the invention is therefore chosen to be 18½ threads per inch.

FIG. 7 illustrates how a piece of hardware 22 having a BSP Tr. thread will be accepted by port 18 of the body 19 and FIG. 11 shows the acceptance of a plug 23 with BSP Pl. threads by the port. As before, a BSP Tr. will enter slightly further than the NPT, and the BSP Pl. will engage the parallel portions of the port threads to a greater extent than the tapered portions.

Figure 4:
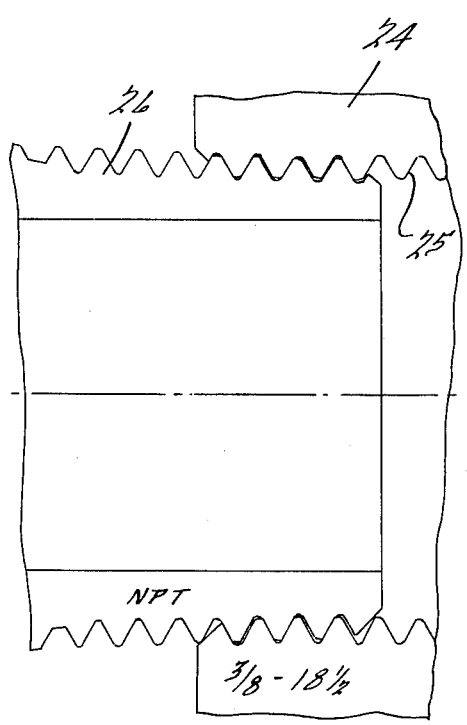
Figure 8:
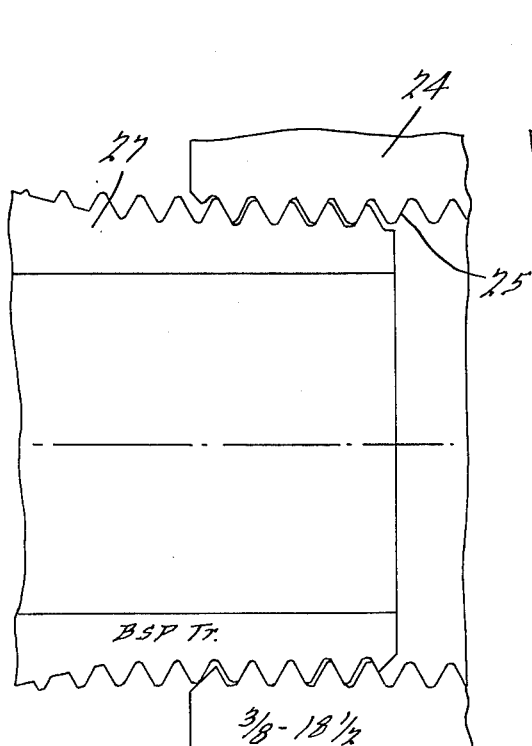
Figure 12:
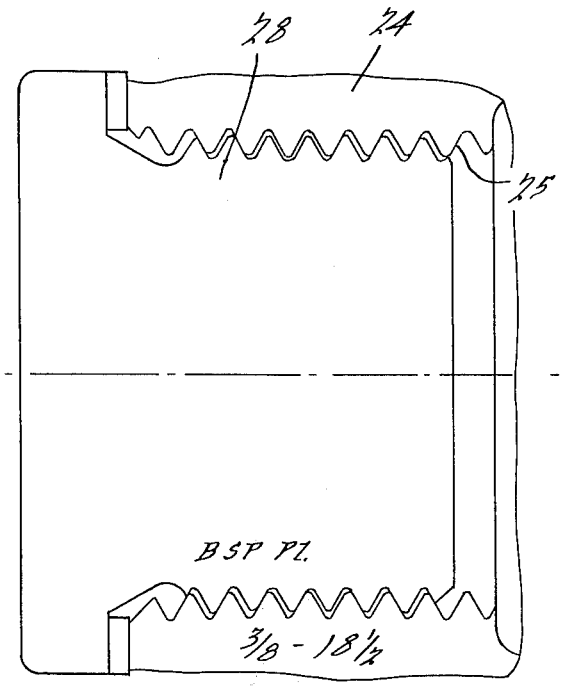

FIGS. 4, 8 and 12 show body 24 having a port 25 made according to the invention for connecting hardware with nominal tube bores of ⅜ inch. Standard threads of this nominal size have a major diameter of 0.6789 inch and an entry OD of 0.6534 inch whereas BSP Tr. standards require a major diameter of 0.6651 inch with an entry OD of 0.6404 inch and BSP Pl. a major diameter of 0.656 inch. Pitch requirements are 18 threads per inch for NPT and 19 for BSP.

According to the invention, the major diameter of the parallel threads in port 25 are 0.6606 inch but there is a tapered portion TL which permits entry of NPT hardware 26 as shown in FIG. 8. The pitch of port 24 is 18½ threads per inch. The length TL results in the first three threads of the tapped hole being tapered, permitting good sealing action for member 26. At the same time, port 25 will satisfactorily receive a member 27 (FIG. 8) having a BSP Tr. thread, as well as a member 28 with a BSP Pl. thread. As in the cases described previously, the BSP Pl. hardware will not engage the first few threads of the port.

Figure 5:
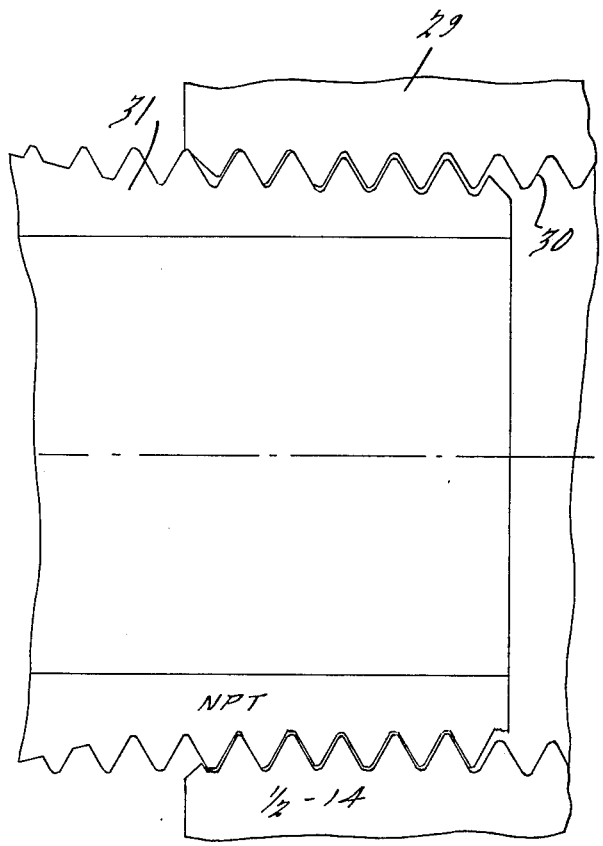
Figure 9:
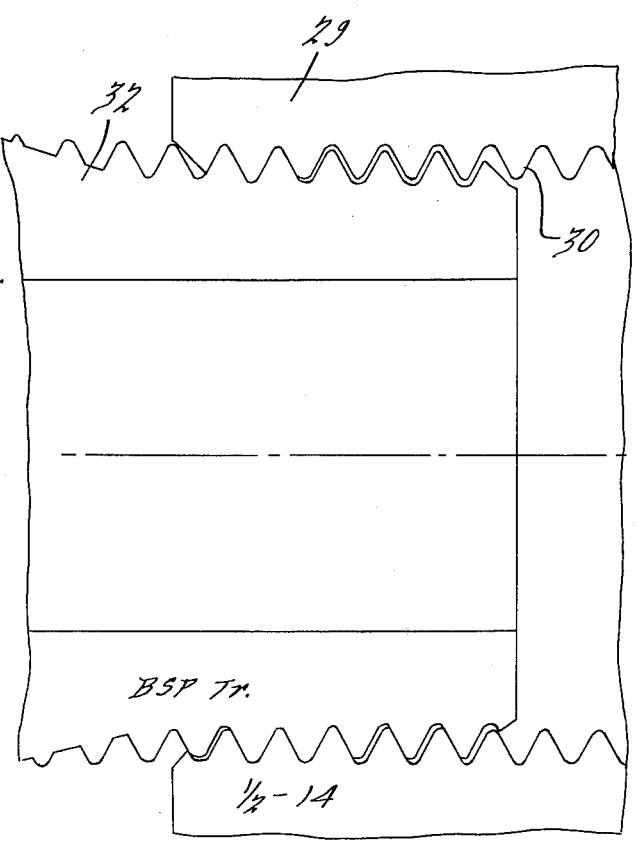
Figure 13:
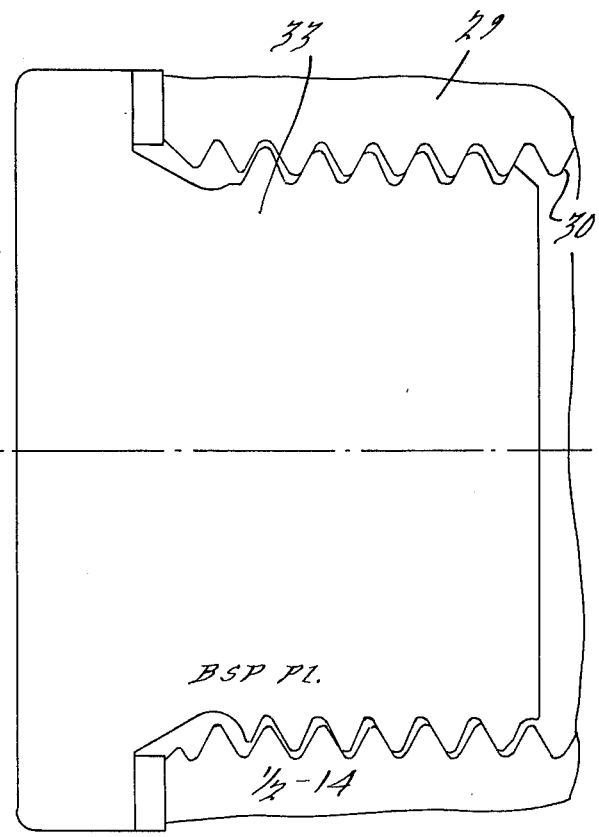

FIGS. 5, 9 and 13 illustrate a body 29 having a port 30 constructed according to the invention for accepting hardware with a nominal tube bore of ½ inch. In this case, pitch standards are compatible for both NPT and BSP threads, namely, 14 threads per inch. Major diameter and entry diameter for NPT threads are 0.8457 and 0.8123 inch respectively. Corresponding requirements for BSP Tr. are 0.8374 and 0.8050 inch, and the major diameter standard for BSP Pl. 0.825 inch.

In order to achieve proper sealing, port 30 is constructed so as to have a major diameter A for the parallel threads of 0.8298 inch and a tapered thread length TL of 0.15 inch, the taper being 1.06 inch per foot. This results in tapering the first two threads so that, as seen in FIG. 5, NPT hardware 31 will sealingly engage these threads. BSP Tr. hardware 32 will engage thread 30 as shown in FIG. 9 and BSP Pl. hardware 33 as shown in FIG. 13.

FIGS. 14, 16 and 18 show a body 34 having a port 35 constructed according to the invention for the reception of externally threaded hardware with nominal tube bores of ¾ inch. Pitch standards are compatible for this nominal size in NPT and BSP, namely 14 threads per inch. NPT standards call for a major diameter of 1.0557 inch and an entry outside diameter of 1.0216 inch. BSP Tr. standards require a major diameter of 1.0533 inch and an entry OD of 1.0176 inch. BSP Pl. standards require a major diameter of 1.041 inch. Because of the very slight oversize of NPT major diameter as compared with BSP, any required increase in size of the entrance of port 35 according to the invention is insignificant. However, the outside tap diameter is recommended to be 1.044 to 1.0474 inch, slightly larger than the requirements for BSP Pl. No tapered portion is necessary in this port. Of course, as in the previous cases, the included angle between facing sides of thread is 57½° according to the invention.

FIG. 14 shows hardware 36 with an NPT thread engaging port 35. FIG. 16 shows a member 37 with BSP Tr. thread and FIG. 18 a member 37 with BSP Pl. thread. In all cases, proper sealing and axial force resistance will be achieved.

FIGS. 15, 17 and 19 show a body 39 with a port 40 constructed according to the invention in order to receive externally threaded hardware with nominal tube bores of 1 inch. In this case, standards call for a pitch of NPT of 11.5 threads per inch and for BSP of 11 threads per inch. According to the invention, the pitch of port 39 is 11¼ threads per inch. As before, the included angle between facing thread sides is 57½°.

The relative requirements for NPT and BSP threads at this nominal size are such that no taper thread length TL is necessary. More particularly, NPT connecting hardware thread standards are 0.0315 inch under the BSP Pl. tap diameter requirement. Hardware 41 with NPT threads will enter port 40 at least five turns before interference occurs. (Although FIG. 15 shows only four engaged threads, this is because part 41 is shown only in a hand-tight condition.) This still leaves approximately three turns for sealing before the imperfect threads enter the tapped hole.

FIG. 17 shows hardware 42 received by port 40, this hardware having BSP Tr. threads. FIG. 19 shows hardware 43 with BSP Pl. threads in port 40.

Ports constructed according to the invention for nominal tube bores of 1¼ and 1½ inches are not illustrated because ports in those sizes will be constructed analogously to port 40. That is, the pitch will be 11.25 threads per inch, there will be no tapered thread portion and the included angle between facing thread sides will be 57½°. As in the 1 inch size, the relative major entry diameters required for NPT and BSP are such that no tapered entry portion is necessary.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

We claim:

1. A threaded port in a valve body for the reception of hardware having NPT, BSP Tr. or BSP Pl. external threads with nominal tube bores at least between ¼ and 1 inch, comprising threads having a pitch midway between the NPT and BSP pitches for the nominal tube bore and an included angle between thread sides of 57½°.

2. A thread port according to claim 1 wherein the first two threads at the entrance of the port are tapered inwardly and the remaining threads are parallel.

* * * * *

UNITED STATES PATENT AND TRADEMARK OFFICE
CERTIFICATE OF CORRECTION

PATENT NO. : 4,033,615
DATED : July 5, 1977
INVENTOR(S) : Miller, Raymond A., Jr. and Thornton, Douglas M.

It is certified that error appears in the above-identified patent and that said Letters Patent are hereby corrected as shown below:

Column 1, line 58:  "57-2/3°" should be "57-1/2°"

Signed and Sealed this

Eleventh Day of October 1977

[SEAL]

Attest:

RUTH C. MASON
Attesting Officer

LUTRELLE F. PARKER
Acting Commissioner of Patents and Trademarks